US009556329B2

(12) United States Patent
Pialot et al.

(10) Patent No.: US 9,556,329 B2
(45) Date of Patent: *Jan. 31, 2017

(54) METHOD FOR MAKING A SELF-SEALING COMPOSITION

(75) Inventors: Frederic Pialot, Molssat (FR); Damien Fombelle, Chappes (FR); Bozena Voge, Coumon D'Auvergne (FR); Jose Merino Lopez, Riom (FR)

(73) Assignees: Michelin Recherche et Technique S.A., Granges-Paccot (CH); COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 229 days.

This patent is subject to a terminal disclaimer.

(21) Appl. No.: 13/055,653

(22) PCT Filed: Jul. 20, 2009

(86) PCT No.: PCT/EP2009/005244
§ 371 (c)(1),
(2), (4) Date: Apr. 18, 2011

(87) PCT Pub. No.: WO2010/009851
PCT Pub. Date: Jan. 28, 2010

(65) Prior Publication Data
US 2012/0115984 A1 May 10, 2012

(30) Foreign Application Priority Data

Jul. 24, 2008 (FR) ..................... 08 55040

(51) Int. Cl.
| | | |
|---|---|---|
| C08J 3/20 | (2006.01) |
| C08L 7/00 | (2006.01) |
| B29C 73/16 | (2006.01) |
| B60C 5/14 | (2006.01) |
| B60C 19/12 | (2006.01) |
| C08J 3/22 | (2006.01) |
| C08J 3/24 | (2006.01) |
| C08L 9/00 | (2006.01) |
| C08L 21/00 | (2006.01) |
| B29L 30/00 | (2006.01) |
| C08K 5/31 | (2006.01) |
| C08L 45/00 | (2006.01) |
| C08L 101/00 | (2006.01) |

(52) U.S. Cl.
CPC ............... *C08L 7/00* (2013.01); *B29C 73/163* (2013.01); *B60C 5/14* (2013.01); *B60C 19/122* (2013.04); *C08J 3/226* (2013.01); *C08J 3/247* (2013.01); *C08L 9/00* (2013.01); *C08L 21/00* (2013.01); *B29L 2030/00* (2013.01); *C08J 2407/00* (2013.01); *C08J 2409/00* (2013.01); *C08J 2421/00* (2013.01); *C08K 5/31* (2013.01); *C08L 45/00* (2013.01); *C08L 101/00* (2013.01)

(58) Field of Classification Search
CPC ................................. C08L 9/00; C08K 3/0016
USPC .......................... 523/166, 351; 525/343, 192
See application file for complete search history.

(56) References Cited

U.S. PATENT DOCUMENTS

| | | | |
|---|---|---|---|
| 4,616,048 A | 10/1986 | De Trano et al. | |
| 4,687,794 A * | 8/1987 | Huddleston et al. | 523/351 |
| 5,085,942 A * | 2/1992 | Hong et al. | 428/492 |
| 5,295,525 A * | 3/1994 | Sanda, Jr. | 152/503 |
| 5,914,364 A | 6/1999 | Cohen et al. | |
| 6,103,808 A * | 8/2000 | Hashimoto | 524/484 |
| 6,156,822 A * | 12/2000 | Materne et al. | 523/212 |
| 6,242,523 B1 * | 6/2001 | Blok et al. | 524/495 |
| 6,397,912 B1 * | 6/2002 | Watanabe et al. | 152/510 |
| 7,073,550 B2 * | 7/2006 | Reiter et al. | 152/503 |
| 2002/0115767 A1 | 8/2002 | Cruse et al. | |
| 2004/0092644 A1 * | 5/2004 | Labauze | 524/492 |
| 2004/0092648 A1 * | 5/2004 | Jones et al. | 524/502 |
| 2006/0083881 A1 * | 4/2006 | Saito et al. | 428/36.9 |
| 2007/0161735 A1 | 7/2007 | Bergman | |
| 2008/0009564 A1 * | 1/2008 | Robert et al. | 523/351 |

FOREIGN PATENT DOCUMENTS

| | | |
|---|---|---|
| EP | 0 161 201 | 11/1985 |
| FR | 2 866 028 | 8/2005 |
| FR | 2 877 348 | 5/2006 |
| WO | WO 01/85837 | 11/2001 |

OTHER PUBLICATIONS

"Plasticizer." http://greenvetpractice.com/pop-up/plasticizer/pop_up.html. Retrieved online Dec. 18, 2012.*
Anomyme, "Material safety datasheet: Sundex 8125", pp. 1-5, XP002515554, http://www.recarroll.com/cw3/Assets/product_files/Sundex%208125TN.pdf>, Feb. 17, 2009.
J.C. Mitchell:, "The melting point of cis-1,4-polybutadiene", Journal of Polymer Science Part B: Polymer Letters, vol. 1, No. 6, pp. 285-288, 1963, XP002515576, http://dx.doi.org/10.1002/pol,1963.110010604>, Feb. 17, 2009.

* cited by examiner

*Primary Examiner* — Hannah Pak
(74) *Attorney, Agent, or Firm* — Cozen O'Connor

(57) ABSTRACT

A process for manufacturing a self-sealing elastomer composition, said process comprising the following steps: a masterbatch, comprising at least one diene elastomer and more than 30 phr of a hydrocarbon resin, is firstly manufactured by compounding these various components in a mixer at a temperature or up to a temperature called the "hot compounding" temperature which is above the softening point of the hydrocarbon resin; and then at least one crosslinking system is incorporated into the masterbatch thus prepared, by compounding everything in the same mixer or in a different mixer, at a temperature or up to a temperature which is kept below 100° C., in order to obtain said self-sealing composition.

25 Claims, 2 Drawing Sheets

METHOD FOR MAKING A SELF-SEALING COMPOSITION

RELATED APPLICATION

This is a U.S. National Phase Application under 35 USC 371 of International Application PCT/EP2009/005244, filed on Jul. 20, 2009.

This application claims the priority of French patent application no. 08/55040 filed Jul. 24, 2008, the entire content of which is hereby incorporated by reference.

FIELD OF THE INVENTION

The present invention relates to self-sealing compositions and to their use as puncture-resistant layers in any type of "inflatable" article, that is to say, by definition, any article that takes its useable shape when inflated with air.

The invention relates more particularly to processes for manufacturing self-sealing compositions based on diene elastomers such as natural rubber.

BACKGROUND OF THE INVENTION

Particularly in recent years, tire manufacturers have been making considerable efforts to develop novel solutions to a problem dating from the very first use of tired wheels of the inflatable type, namely the problem of how to allow the vehicle to continue to travel despite a considerable or complete loss of pressure of one or more tires. For decades, the spare tire was considered to be the only and universal solution. Then, more recently, the substantial advantages associated with its possible omission have become apparent. The concept of "extended mobility" was developed. The associated techniques allow the same tire to run, depending on certain limits to be respected, after a puncture or a drop in pressure. This makes it possible for example to drive to a breakdown point without having to stop, often in hazardous circumstances, to fit the spare tire.

Self-sealing compositions that allow such an objective to be achieved, and which by definition are capable of automatically ensuring, that is to say without external intervention, that a tire is sealed in the event of a perforation of the latter by a foreign body, such as a nail, are particularly difficult to develop.

To be useable, a self-sealing layer must satisfy many conditions of a physical and chemical nature. In particular, it must be effective over a very wide range of operating temperatures, and be so throughout the lifetime of the tires. It must be capable of closing off the hole when the perforating object remains in place and, when the latter is expelled, said self-sealing layer must be able to fill the hole and seal the tire.

Many solutions have admittedly been devised but have not been able truly to be developed hitherto for vehicle tires, in particular because of difficulties in manufacturing these self-sealing compositions and therefore the final cost thereof.

In particular, effective self-sealing compositions, based on natural rubber and a hydrocarbon resin as tackifier, have been described in the U.S. Pat. No. 4,913,209, U.S. Pat. No. 5,085,942 and U.S. Pat. No. 5,295,525. These compositions are characterized by the combined presence of a high hydrocarbon resin content, always greater than 100 phr, and a large amount of elastomer in the liquid state, generally in the form of depolymerized natural rubber (typically with a molecular weight between 1000 and 100 000).

Firstly, such a high resin content, apart from the fact that it may be prejudicial to hysteresis and consequently to the rolling resistance of tires, requires particularly long and difficult kneading of the elastomeric matrix.

The use of a large amount of liquid elastomer admittedly improves the fluidity of the composition, but such a use is a source of other drawbacks, especially a risk of the self-sealing composition creeping during use at a relatively high temperature (typically above 60° C.), as frequently encountered when using certain tires.

If the liquid elastomer content is reduced or if it is completely omitted, another major manufacturing problem may then arise: in the absence of a filler such as carbon black, or at the very least with an appreciable amount of such as a filler (moreover not desirable, as is known, for this type of application), the composition is not very cohesive. This lack of cohesion may be such that the tack of the composition, resulting from the high content of tackifier employed, is no longer compensated for and carries it away. It then follows that there is a risk of the composition undesirably sticking on the compounding tools, which is unacceptable under industrial operating conditions.

SUMMARY OF THE INVENTION

One object of the present invention is to provide a manufacturing process which makes it possible to alleviate, or at the very least substantially reduce, the various aforementioned drawbacks.

This and other objects are attained in accordance with one aspect of the present invention directed to a process for manufacturing a self-sealing elastomer composition, said process comprising at least the following steps:

a) a masterbatch, comprising at least one diene elastomer and more than 30 phr of a hydrocarbon resin, is firstly manufactured by compounding these various components in a mixer at a temperature or up to a temperature called the "hot compounding" temperature which is above the softening point of the hydrocarbon resin; and b) then at least one crosslinking system is incorporated into the masterbatch thus prepared, by compounding everything in the same mixer or in a different mixer, at a temperature or up to a temperature which is kept below 100° C., in order to obtain said self-sealing composition.

Such a process has proved to be particularly suitable for rapidly manufacturing, under industrially acceptable operating conditions, an effective self-sealing composition based on a diene elastomer and a hydrocarbon resin, it being possible for this composition to have high hydrocarbon resin contents without requiring the use of elastomer in the liquid state.

BRIEF DESCRIPTION OF THE DRAWINGS

The invention and its advantages will be readily understood in the light of the description and the following embodiments, and also FIGS. 1 and 2 relating to these embodiments that show schematically, in a simple manner, without being drawn to a specific scale:

an example of a compounding extruder that can be used to carry out a process according to an embodiment of the invention (FIG. 1); and in radial cross section, an example of a tire using a self-sealing composition prepared using the process according to an embodiment of the invention (FIG. 2).

DETAILED DESCRIPTION OF PREFERRED EMBODIMENTS OF THE INVENTION

Figure 1:
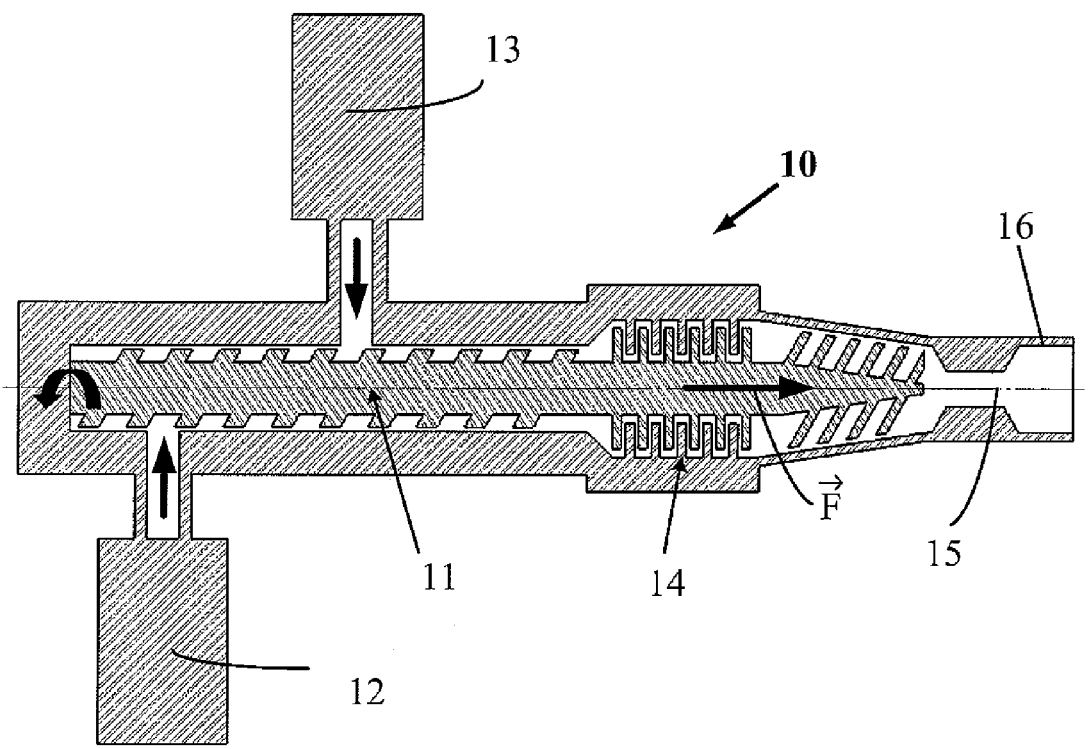

In the present description, unless expressly indicated otherwise, all the percentages (%) indicated are % by weight.

Moreover, any range of values denoted by the expression "between a and b" represents the range of values starting from more than "a" to less than "b" (i.e. with the limits "a" and "b" excluded), whereas any range of values denoted by the expression "from a to b" means the range of values starting from "a" and going up to "b", i.e. including the strict limits "a" and "b".

I-1. Process of the Invention

The process according to the invention therefore has, as essential steps, the two following steps:
- a) a masterbatch, comprising at least one diene elastomer and more than 30 phr of a hydrocarbon resin is, firstly manufactured, by compounding these various components in a mixer at a temperature or up to a temperature called the "hot compounding temperature" or "first temperature" which is above the softening point of the hydrocarbon resin; and
- b) then at least one crosslinking system is incorporated into said masterbatch, by compounding everything, in the same mixer or in a different mixer, at a temperature or up to a temperature called the "second temperature" which is maintained below 100° C., in order to obtain said self-sealing composition.

The above first and second temperatures are of course those of the masterbatch and of the self-sealing composition respectively, these being temperatures measureable in situ and not the set temperatures of the mixers themselves.

The term "masterbatch" should be understood here to mean, by definition, a compound comprising at least a diene elastomer and more than 30 phr of the hydrocarbon resin, namely the precursor compound for the final self-sealing composition ready to be used.

Optionally, various additives may be incorporated into this masterbatch, whether these are intended for the masterbatch proper (for example a stabilizing agent, a colorant, a UV stabilizer, an antioxidant, etc.) or for the final self-sealing composition for which the masterbatch is intended.

The masterbatch may be manufactured using any compounding tool, especially in a blade mixer, a two-roll open mill, an extruder, or any mixer capable of mixing or kneading its various components sufficiently to obtain a homogeneous compound in which said components are intimately mixed. It is preferred to use a compounding screw extruder, a screw pitch of which may or may not be constant, capable of introducing, in a known manner, a large amount of shear into the compound (diene elastomer plus resin) during the formation thereof.

In the initial stage, that is to say before its contact with the elastomer, the hydrocarbon resin can be in the solid state or the liquid state. During contacting of the diene elastomer (which is a solid) with the hydrocarbon resin, the latter may be in the solid state or, according to a more preferential embodiment, already in the liquid state. To do this, all that is required is to heat the resin to a temperature above its softening point.

Depending on the type of hydrocarbon resin used, the maximum temperature (or first temperature), called the hot compounding temperature, is typically above 70° C., preferably above 80° C., for example between 100° C. and 150° C.

For optimum compounding of the masterbatch, the hydrocarbon resin is preferably injected in the liquid state, under pressure, into the mixer. According to another preferential embodiment, whether or not combined with the previous one, the hot compounding step a) is carried out away from oxygen.

Step b) of incorporating the crosslinking system is itself carried out at a temperature or up to a maximum temperature (or second temperature) which is kept below 100° C., preferably below 80° C.

According to another preferential embodiment of the invention, the second temperature is kept below the softening point of the resin. Thus, depending on the type of hydrocarbon used, the compounding temperature of step b) is preferably below 50° C., more preferably between 20° C. and 40° C.

If necessary, an intermediate step of cooling the masterbatch may be inserted between steps a) and b) described above, so as to bring its temperature to below 100° C., preferably below 80° C., especially below the softening point of the resin, this being carried out before the introduction (step b)) of the crosslinking system into the masterbatch prepared beforehand.

I-2. Formulation of the Self-Sealing Composition

The self-sealing material or composition that can be prepared according to the process of the invention is therefore an elastomer composition comprising at least one diene elastomer, more than 30 phr of a hydrocarbon resin and a crosslinking system. Apart from optional additives, said composition may or may not include a small fraction of a reinforcing filler. Its formulation is described in greater detail below.

a) Diene Elastomer

As is known, diene elastomers may be classified in two categories: saturated and unsaturated. Here it is preferred to use diene elastomer of the unsaturated type i.e. by definition a diene elastomer obtained at least partly from conjugated diene monomers and having a content of repeat units derived from conjugated dienes which is greater than 30 mol %. Compared to diene elastomers of the liquid type, the diene elastomer of the composition of the invention is by definition a solid. Typically, its number-average molecular weight ($M_n$) is between 100 000 and 5 000 000, more particularly between 200 000 and 4 000 000 g/mol.

More preferably, the diene elastomer is chosen from the group formed by polybutadienes (BR), natural rubber (NR), synthetic polyisoprenes (IR), butadiene copolymers (for example butadiene-stirene or SBR), isoprene copolymers and blends of these elastomers.

Even more preferably, the diene (preferably unsaturated) elastomer of the composition of the invention is an isoprene elastomer, preferably chosen from the group formed by natural rubber (NR), synthetic polyisoprenes (IR), butadiene-isoprene copolymers (BIR), stirene-isoprene copolymers (SIR), stirene-butadiene-isoprene copolymers (SBIR) and blends of these elastomers. Preferably, this isoprene elastomer is natural rubber or a synthetic cis-1,4-polyisoprene.

The above (preferably unsaturated) diene elastomer, especially an isoprene elastomer such as natural rubber, may constitute all of the elastomer matrix or the predominant amount by weight (preferably comprising more than 50%, even more preferably more than 70%) of said matrix when it contains one or more other elastomers, with a diene or non-diene elastomers, for example of the thermoplastic elastomer type. In other words, and preferably, in the composition of the invention, the content of (preferably unsaturated) diene elastomer, especially isoprene elastomer such as natural rubber, is greater than 50 phr, more preferably greater than 70 phr (phr meaning, as is known, parts by weight per one hundred parts of solid rubber). Even more preferably, this content of (preferably unsaturated) diene elastomer, especially isoprene elastomer such as natural rubber, is greater than 80 phr.

According to one particular embodiment, the above diene elastomer, especially when it is an isoprene diene elastomer such as natural rubber, is the sole elastomer present in the self-sealing composition of the invention. However, this isoprene elastomer could also, according is to other possible embodiments, be combined with other (solid) elastomers in a minor content by weight, whether these be unsaturated diene elastomers (for example BR or SBR) or even saturated diene elastomers (for example butyl), or else elastomers other than diene elastomers, in particular thermoplastic stirene (TPS) elastomers, for example chosen from the group formed by stirene/butadiene/stirene (SBS), stirene/isoprene/stirene (SIS), stirene/butadiene/isoprene/stirene (SBIS), stirene/isobutylene/stirene (SIBS), stirene/ethylene-butylene/stirene (SEBS), stirene/ethylene-propylene/stirene (SEPS), stirene/ethylene-ethylene-propylene/stirene (SEEPS) block copolymers and blends of these copolymers.

b) Hydrocarbon Resin

The term "resin" is reserved in the present application, by definition, as known to those skilled in the art, to a compound which is solid at room temperature (23° C.), as opposed to a liquid plasticizer compound such as an oil.

Hydrocarbon resins are polymers well known to those skilled in the art, essentially based on carbon and hydrogen, which can be used in particular as plasticizers or tackifiers in polymeric matrices. They are by nature miscible (i.e. compatible) in the contents used with the polymer compositions for which they are intended, so as to act as true diluents. They have been described for example in the work entitled "*Hydrocarbon Resins*" by R. Mildenberg, M. Zander and G. Collin (New York, VCH, 1997, ISBN 3-527-28617-9), Chapter 5 of which is devoted to their applications, especially in rubber tires (5.5. "*Rubber Tires and Mechanical Goods*"). They may be aliphatic, cycloaliphatic, aromatic, hydrogenated aromatic, of the aliphatic/aromatic type, i.e. based on aliphatic and/or aromatic monomers. They may be natural or synthetic resins, whether or not based on petroleum (if such is the case, they are also known as petroleum resins).

Their glass transition temperature ($T_g$) is preferably above 0° C., especially above 20° C. (usually between 30° C. and 95° C.).

As is known, these hydrocarbon resins may also be termed thermoplastic resins in the sense that they soften when heated and may thus be moulded. They may also be defined by a softening point or temperature, at which temperature the product, for example in powder form, becomes glutinous. This softening point tends to replace the melting point, which is quite poorly defined, of resins in general. The softening point of a hydrocarbon resin is generally about 50 to 60° C. higher than the $T_g$.

In the composition of the invention, the softening point of the resin is preferably above 40° C. (in particular between 40° C. and 140° C.), more preferably above 50° C. (in particular between 50° C. and 135° C.).

Said resin is used in an amount by weight of between 30 and 90 phr. Below 30 phr, the puncture-resistance performance has proved to be insufficient because of excessive stiffness of the composition, whereas above 90 phr, the material has insufficient mechanical strength with, in addition, a risk of its performance being degraded at high temperature (typically above 70° C.). For these reasons, the resin content is preferably between 40 and 80 phr, even more preferably at least equal to 45 phr, especially in the 45 to 75 phr range.

According to a preferred embodiment of the invention, the hydrocarbon resin has at least any one of, and more preferably all, the following characteristics:
 a $T_g$ above 25° C.;
 a softening point above 50° C. (in particular between 50° C. and 135° C.);
 a number-average molecular weight ($M_n$) of between 400 and 2000 g/mol; and
 a polydispersity index ($I_p$) of less than 3 (it will be recalled that $I_p=M_w/M_n$, where $M_w$ is the weight-average molecular weight).

More preferably, this hydrocarbon resin has at least any one of, more preferably all, the following characteristics:
 a $T_g$ of between 25° C. and 100° C. (especially between 30° C. and 90° C.);
 a softening point above 60° C., in particular between 60° C. and 135° C.;
 a number-average molecular weight $M_n$ of between 500 and 1500 g/mol; and
 a polydispersity index $I_p$ of less than 2.

The $T_g$ is measured according to the ASTM D3418 (1999) standard. The softening point is measured according to the ISO 4625 standard ("Ring and Ball" method). The macrostructure ($M_w$, $M_n$ and $I_p$) is determined by steric exclusion chromatography (SEC): tetrahydrofuran solvent; 35° C. temperature; 1 g/l concentration; 1 ml/min flow rate; solution filtered on a filter of 0.45 μm porosity before injection; Moore calibration using polystyrene; set of three WATERS columns in series ("STYRAGEL" HR4E, HR1 and HR0.5); differential refractometer (WATERS 2410) detection and its associated operating software (WATERS EMPOWER).

As examples of such hydrocarbon resins, mention may be made of those chosen from the group formed by cyclopentadiene (abbreviated to CPD) or dicyclopentadiene (abbreviated to DCPD) homopolymer or copolymer resins, terpene homopolymer or copolymer resins, $C_5$-cut homopolymer or copolymer resins, and blends of these resins. Among the above copolymer resins, mention may more particularly be made of those chosen from the group formed by (D)CPD/vinylaromatic copolymer resins, (D)CPD/terpene copolymer resins, (D)CPD/$C_5$-cut copolymer resins, terpene/vinylaromatic copolymer resins, $C_5$-cut/vinylaromatic copolymer resins and blends of these resins.

The term "terpene" includes here, as is known, alpha-pinene, beta-pinene and limonene monomers. It is preferable to use a limonene monomer, a compound which, as is known, can take the form of three possible isomers: L-limonene (laevogyratory enantiomer), D-limonene (dextrogyratory enantiomer), or else dipentene (the racemic mixture of the dextrogyratory and laevogyratory enantiomers). Suitable vinylaromatic monomers are for example: stirene, alpha-methylstirene, ortho-, meta- and para-methylstirene, vinyltoluene, para-tert-butylstirene, methoxystirenes, chlorostirenes, hydroxystirenes, vinylmesitylene, divinylbenzene, vinylnaphthalene and any vinylaromatic monomer derived from a $C_9$-cut (or more generally a $C_8$- to $C_{10}$-cut).

More particularly, mention may be made of resins chosen from the group formed by (D)CPD homopolymer resins, (D)CPD/stirene copolymer resins, polylimonene resins, limonene/stirene copolymer resins, limonene/D(CPD) copolymer resins, $C_5$-cut/stirene copolymer resins, $C_5$-cut/$C_9$-cut copolymer resins and blends of these reins.

All the above resins are well known to those skilled in the art and are commercially available, for example those sold by DRT under the name "Dercolyte" in the case of polylimonene resins, those sold by Neville Chemical Company under the name "Super Nevtac" or sold by Kolon under the name "Hikorez" as regards $C_5$-cut/stirene resins or $C_5$-cut/$C_9$-cut resins, or else by Struktol under the name "40 MS" or "40 NS" or by Exxon Mobil under the name "Escorez" (which are blends of aromatic and/or aliphatic resins).

c) Crosslinking System

The self-sealing composition further includes a crosslinking system for the diene elastomer, this crosslinking system preferably being a crosslinking system based on sulphur, in other words a "vulcanization" system.

Preferably, the sulphur-based vulcanization system includes, as vulcanization activator, a guanidine derivative, i.e. a substituted guanidine. Substituted guanidines are well known to those skilled in the art (see for example WO 00/05300) and non-limiting examples that may be mentioned include: N,N'-diphenylguanidine (abbreviated to DPG), triphenylguanidine and di-o-tolylguanidine. Preferably, DPG is used.

In this vulcanization system, to obtain optimum self-sealing performance the sulphur content is preferably between 0.1 and 1.5 phr, in particular between 0.2 and 1.2 phr (for example between 0.2 and 1.0 phr) and the guanidine derivative content is itself between 0 and 1.5 phr, in particular between 0 and 1.0 phr (especially in the 0.2 to 0.5 phr range).

Said system does not require a vulcanization accelerator to be present. According to a preferred embodiment, the composition may therefore contain no such accelerator, or at the very most it may contain less than 1 phr, more preferably less than 0.5 phr, thereof. If such an accelerator is used, mention may be made, as an example, of any compound (primary or secondary accelerator) that can act as an accelerator for vulcanizing diene elastomers in the presence of sulphur, especially accelerators of the thiazole type and derivatives thereof, thiuram-type accelerators and zinc dithiocarbamates.

According to another advantageous embodiment, the above vulcanization system may contain no zinc or zinc oxide (these being known as vulcanization activators).

According to another possible embodiment of the invention, a sulphur donor may be used instead of sulphur itself. Sulphur donors are well known to those skilled in the art. Typically, the amount of such a sulphur donor will preferably be adjusted to be between 0.5 and 10 phr, more preferably between 1 and 5 phr, so as to achieve the preferred equivalent sulphur contents indicated above (namely between 0.1 and 1.5 phr, in particular between 0.2 and 1.2 phr, of sulphur).

After curing, a vulcanization system as described above gives the composition sufficient cohesion, without truly vulcanizing it: the amount of crosslinking, which can be measured using a conventional swelling method known to those skilled in the art, is in fact close to the detection threshold.

d) Filler

The composition prepared according to the process of the invention has another feature of being unfilled or very lightly filled, that is to say containing 0 to less than 30 phr of filler.

The term "filler" is understood here to mean any type of filler, whether they are reinforcing (typically nanoparticles with a weight-average size preferably of less than 500 nm, especially between 20 and 200 nm) or whether they are non-reinforcing or inert (typically microparticles with a weight-average size of greater than 1 µm, for example between 2 and 200 µm).

These fillers, whether reinforcing or not, are essentially there only to give the final composition dimensional stability, i.e. the minimum mechanical integrity required. When the filler is known to be reinforcing vis-á-vis an elastomer, especially an isoprene elastomer such as natural rubber, it is preferable to use an even less amount thereof.

Too high an amount, especially more than 30 phr, no longer makes it possible to achieve the minimum required flexibility, deformability and creep properties. For these reasons, the self-sealing composition preferably comprises 0 to less than 20 phr, more preferably 0 to less than 10 phr, of filler.

As examples of fillers known to those skilled in the art as reinforcing fillers, mention may in particular be made of carbon black nanoparticles or a reinforcing inorganic filler, or a blend of these two types of filler.

For example, as carbon blacks, all carbon blacks, especially blacks of the HAF, ISAF and SAF types that are conventionally used in tires (these being called tire-grade blacks), are suitable. Among such blacks, the following may more particularly be mentioned: carbon blacks of the 300, 600 or 700 series (ASTM grades), such as for example the blacks N326, N330, N347, N375, N683 and N772. Suitable reinforcing inorganic fillers are especially mineral fillers of the silica ($SiO_2$) type, especially precipitated or pyrogenic silica having a BET surface area of less than 450 $m^2/g$, preferably from 30 to 400 $m^2/g$.

As examples of fillers known to those skilled in the art as non-reinforcing or inert fillers, the following may especially be mentioned: microparticles of natural calcium carbonate (chalk) or synthetic calcium carbonate, synthetic or natural silicates (such as kaolin talc or mica), milled silicas, titanium oxides, aluminas or even aluminosilicates. As examples of lamellar fillers, graphite particles may in particular be mentioned. Pigmenting or coloured fillers could be advantageously used to colour the composition according to the desired colour.

The physical state of the filler does not matter—it could be in the form of powder, microspheres, granules or beads, or any other suitable densified form. Of course, the term "filler" also is understood to mean mixtures of various reinforcing and/or non-reinforcing, fillers.

A person skilled in the art will know, in the light of the present description, how to adjust the formulation of the self-sealing composition so as to achieve the desired property levels and to adapt the formulation to the envisaged specific application.

According to one particular advantageous embodiment of the invention, if a reinforcing filler is present in the self-sealing composition, its content is preferably less than 5 phr (i.e. between 0 and 5 phr), in particular less than 2 phr (i.e. between 0 and 2 phr). Such contents have proved to be particularly favourable to the process for manufacturing the invention, while still providing the composition with excellent self-sealing properties. More preferably a content between 0.5 and 2 phr is used, particularly when the filler is carbon black.

When a filler such as carbon black is used, it may be introduced during step a), i.e. at the same time as the unsaturated diene elastomer and the hydrocarbon resin, or else during step b), i.e. at the same time as the crosslinking system. It has been found that a very small amount of carbon black, preferably between 0.5 and 2 phr, further improves the compounding and the manufacture of the composition, and also its final extrudability.

e) Other Possible Additives

The base constituents described above are sufficient in themselves for the self-sealing composition to completely fulfil its puncture-resistance function in inflatable articles in which it is used. However, various other additives may be added, typically in a small amount (preferably with contents of less than 20 phr, more preferably less than 15 phr), such as for example protection agents, such as UV stabilizers, antioxidants or antiozonants, various other stabilizers, and colouring agents that can be advantageously used to colour the self-sealing composition. Depending on the intended application, fibres, in the form of short fibres or pulp form, could optionally be added to give the self-sealing composition greater cohesion. Apart from the elastomers described above, the self-sealing composition could also contain, again as a minor weight fraction relative to the unsaturated diene elastomer, polymers other than elastomers such as, for example, thermoplastic polymers compatible with the unsaturated diene elastomer.

II. EXEMPLARY EMBODIMENT OF THE INVENTION

II-1. Manufacture of the Self-Scaling Composition

As an example, step a) for manufacturing the masterbatch is preferably carried out in a compounding screw extruder as shown schematically in a simple manner in FIG. 1.

FIG. 1 shows a compounding screw extruder (10) essentially comprising an extrusion screw (11) (for example in a single-screw compounding extruder), a first metering pump (12) for the diene elastomer (which is solid) and a second metering pump (13) for the resin. The metering pumps (12, 13) are used to raise the pressure in the extruder while still controlling the metering and the initial characteristics of the materials, before separating the metering function (for elastomer and resin) from the compounding function, while furthermore providing better control of the process.

The products, driven by the extrusion screw, are intimately compounded under the very high shear provided by the rotation of the screw, thus progressing through the mixer, for example up to a part (14) called the "chopper-homogenizer", after which zone the final masterbatch (15) thus obtained, progressing in the direction of the arrow (F), is finally extruded through a die (16) for extruding the product to the desired dimensions.

The masterbatch thus extruded, ready to be used, is then transferred and cooled, for example on an external mixer of the two-roll open mill type for introducing the crosslinking system and the optional filler, the temperature within said external mixer being kept below 100° C., preferably below 80° C. and more preferably below the softening point of the resin. Advantageously, the rolls of the above open mill are cooled, for example by circulating water, to a temperature below 40° C., preferably to below 30° C., so as to avoid any undesirable sticking of the composition to the walls of the mill.

It is possible for the masterbatch output by the extrusion device (10) to be formed directly, so as to make it easier to transport to and/or place in the external mixer. It is also possible for the two-rolled open mill to be continuously fed.

Thanks to the preferred process and specific device described above, it is possible to prepare a self-sealing composition under satisfactory industrial conditions without running the risk of contaminating the tools due to undesirable sticking of the composition on the walls of the mixers.

II-2. Use of the Self-Sealing Composition as Puncture-Resistant Layer

The self-sealing composition or material prepared according to the process of the invention is an elastic compound which is solid and is characterized in particular, thanks to its specific formulation, by a very high flexibility and deformability. It may be used as a puncture-resistant layer in any type of "inflatable" article, that is to say, by definition, any article that takes its useable form when inflated with air. Examples of such inflatable articles that may be mentioned include inflatable boats and balloons or balls used for games or sport.

It is particularly well suited to use as a puncture-resistant layer in an inflatable article, finished or semifinished product, made of rubber, most particularly in tires for a motor vehicle, such as a vehicle of the two-wheeled type, a passenger or industrial vehicle, or a non-automobile vehicle such as a bicycle, more particularly in tires for passenger vehicles liable to run at very high speed or tires for industrial vehicles such as heavy vehicles liable to run and operate under particularly high internal temperature conditions.

Such a puncture-resistant layer is preferably placed on the internal wall of the inflatable article, completely or at least partly covering it, but it may also be completely integrated into its internal structure.

The self-sealing composition described here has the advantage of suffering practically no adverse effect in terms of rolling resistance, over a very wide operating temperature range of the tires, compared with a tire not having such a self-sealing layer. Moreover, compared with the usual self-sealing compositions, the risks of excessive creep during use at a relatively high temperature (typically above 60° C.), as is frequently encountered when using certain tires, are appreciably reduced.

Figure 2:
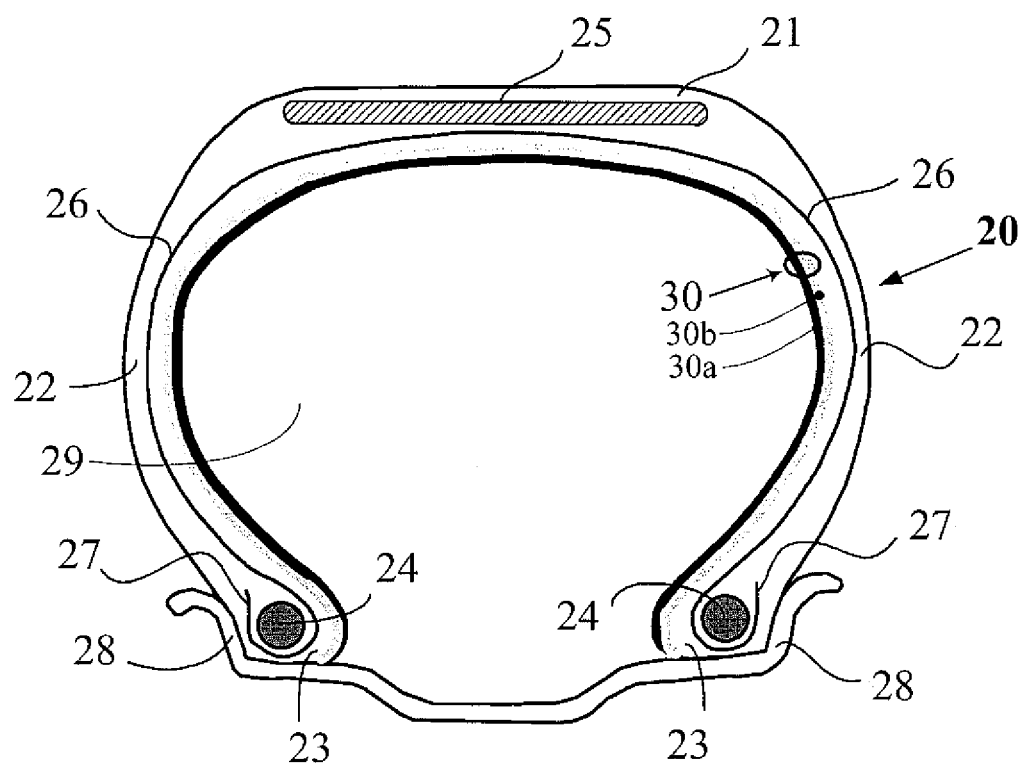

As an example, appended FIG. 2 shows very schematically (without complying to a specific scale), a radial cross section through a tire according to the invention.

This tire 20 comprises a crown 21 reinforced by a crown or belt reinforcement 25, two sidewalls 22 and two beads 23, each of these beads 23 being reinforced with a bead wire 24. The crown 21 is surmounted by a tread (not shown in this schematic figure). A carcass reinforcement 26 is wound around two bead wires 24 in each bead 23, the upturn 27 of this reinforcement 26 lying for example towards the outside of the tire 20, which here is shown fitted onto its rim 28. The carcass reinforcement 26 consists, as is known per se, of at least one ply reinforced by cords, called "radial" cords, for example textile or metal cords, i.e. these cords are arranged practically parallel to one another and extend from one bead to the other so as to make an angle of between 80° and 90° with the circumferential mid-plane (the plane perpendicular to the rotation axis of the tire, which lies at mid-distance between the two beads 23 and passes through the middle of the crown reinforcement 25).

The tire 20 is characterized is that its internal wall includes a multilayer laminate (30) comprising two layers (30a, 30b), which is self-sealing thanks to its first layer (30a) and airtight thanks to its second layer (30b), for example a layer based on butyl rubber. The two layers (30a, 30b) cover substantially the entire internal wall of the tire, extending from one sidewall to the other, at least up to level with the rim gutter when the tire is in the fitted position. The laminate is placed here in such a way that the self-sealing first layer (30a) is radially the outermost layer in the tire, relative to the other layer (30b). In other words, the self-sealing layer (30a) covers the airtight layer (30b) on the side facing the internal cavity 29 of the tire 20.

In this example, the layer 30b (with a thickness of 0.7 to 0.8 mm) is based on butyl rubber and has a conventional formulation for an "inner liner" which usually defines, in a conventional tire, the radially internal face of said tire, intended to protect the carcass reinforcement from air diffusing from the internal space of the tire. This airtight layer 30b therefore enables the tire 20 to be inflated and to hold pressure. Its sealing properties enable it to guarantee a relatively low rate of pressure loss, enabling the tire to be kept inflated, in a normal operating state, for a sufficient duration, normally for several weeks or several months. The layer 30a itself consists of a self-sealing composition prepared using the process according to the invention, comprising the two essential constituents, namely natural rubber (100 phr) and a hydrocarbon resin "Escorez 2101" from Exxon Mobil (having a softening point of about 90° C.) with a weight content of about 50 phr.

More precisely, the above self-sealing composition was prepared using a single-screw (40 L/D) extruder as shown schematically in FIG. 1 (which has already been commented upon). The two base constituents (NR and resin) were compounded at a temperature (between 100 and 130° C.) above the softening point of the resin. The extruder used had two different feeds (hoppers) (one for the NR and the other for the resin) and a pressurized liquid injection pump for the resin (injected at a temperature of about 130° C.). When the elastomer and the resin have thus been intimately mixed, it was found that the undesirable tack of the composition was very significantly reduced.

The above extruder was provided with a die for extruding the masterbatch to the desired dimensions into a two-roll open mill for the final incorporation of the other constituents, namely the vulcanization system based on sulphur (for example 0.5 or 1.2 phr) and DPG (for example 0.3 phr) and carbon black (N772 with a content of 1 phr), at low temperature maintained at below +30° C. (by cooling the rolls with circulating water).

The layer 30a, therefore placed between the layer 30b and the cavity 29 of the tire, provides the tire with effective protection from any loss of pressure due to accidental perforations, by automatically sealing off these perforations.

During trials, tires of the passenger car type, of 205/55 R16 size, of the "Michelin, Energy 3 brand" were tested. The internal wall of the tires (already including the airtight layer 30b) was covered with the self-sealing layer (30a) described above, having a thickness of 3 mm, and then the tires were vulcanized.

On one of the tires, when fitted and inflated, five perforations 5 mm in diameter were produced through the tread and the crown block on the one hand, and through the sidewalls on the other, using punches that were immediately removed.

Unexpectedly, this tire withstood being rotated at 150 km/h on a rolling drum under a nominal load of 400 kg without loss of pressure for more than 1500 km, after which distance the rolling step was stopped.

On another tire, the test was carried out in the same way but this time leaving the perforating objects in place for one week. The same excellent result was obtained.

Without the self-sealing composition and under the same conditions as above, the tire thus perforated loses its pressure in less than one minute, becoming completely unsuitable for rolling.

The invention claimed is:

1. A process for manufacturing a self-sealing elastomer composition, comprising the steps of:
   a) a masterbatch, comprising at least one unsaturated diene elastomer and between 40 and 80 phr of a hydrocarbon resin, is firstly manufactured by compounding the at least one unsaturated diene elastomer and hydrocarbon resin in a mixer at a temperature or up to a temperature called the "hot compounding" temperature which is above the softening point of the hydrocarbon resin, wherein the at least one unsaturated diene elastomer comprises a greater than 50 phr primary unsaturated diene elastomer selected from the group consisting of polybutadienes, natural rubber, synthetic polyisoprenes, butadiene copolymers, isoprene copolymers, and mixtures thereof;
   b) then at least one crosslinking system is incorporated into the masterbatch thus prepared, by compounding everything in the same mixer or in a different mixer, at a temperature or up to a temperature which is kept below 100° C., in order to obtain said self-sealing composition; and
   c) optionally a filler is added with a content between 0 and 30 phr during step 2) or step b),
      wherein during the hot compounding step a), the unsaturated diene elastomer is brought into contact with the hydrocarbon resin in the liquid state,
      wherein the hydrocarbon resin is injected in the liquid state into the same mixer or a different mixer, and
      wherein said hydrocarbon resin has a glass transition temperature (Tg) above 25° C., a softening point above 50° C., a number-average molecular weight (Mn) of between 400 and 2000 g/mol, and a polydispersity index (Ip) of less than 3 (where Ip=Mw/Mn, and Mw is the weight-average molecular weight).

2. The process according to claim 1, wherein step a) for hot compounding the unsaturated diene elastomer with the hydrocarbon resin is carried out away from oxygen.

3. The process according to claim 1, wherein the hot compounding temperature is above 70° C.

4. The process according to claim 1, wherein the hot compounding step a) is carried out in a compounding screw extruder.

5. The process according to claim 1, wherein the compounding temperature of step b) is kept below 80° C.

6. The process according to claim 1, wherein the compounding temperature of step b) is kept below the softening point of the hydrocarbon resin.

7. The process according to claim 1, wherein the compounding temperature of step b) is kept below 50° C.

8. The process according to claim 1, wherein the compounding step b) is carried out on a two-roll open mill.

9. The process according to claim 8, wherein the rolls of the open mill are cooled to a temperature below 40° C.

10. The process according to claim 1, wherein an intermediate step of cooling the masterbatch is inserted between steps a) and b) so as to cool the masterbatch to a temperature below 100° C.

11. The process according to claim 10, wherein the temperature to which the masterbatch is cooled during said intermediate cooling step is below 80° C.

12. The process according to claim 10, wherein the temperature to which the masterbatch is cooled during said intermediate cooling step is below the softening point of the hydrocarbon resin.

13. The process according to claim 7, wherein the filler is introduced during compounding step b).

14. The process according to claim 7, wherein the filler content is between 0 and 20 phr.

15. The process according to claim 7, wherein the filler is carbon black.

16. The process according to claim 15, wherein the carbon black content is less than 5 phr.

17. The process according to claim 16, wherein the carbon black content is between 0.5 and 2 phr.

18. The process according to claim 1, wherein the primary unsaturated diene elastomer is selected from the group consisting of natural rubber, synthetic polyisoprenes and mixtures thereof.

19. The process according to claim 18, wherein the primary unsaturated diene elastomer selected from the group consisting of natural rubber, synthetic polyisoprenes and mixtures thereof is the sole elastomer of the composition.

20. The process according to claim 1, wherein the hydrocarbon resin content lies in the 45 to 75 phr range.

21. The process according to claim 1, wherein the hydrocarbon resin is selected from the group consisting of cyclopentadiene (CPD) homopolymer or copolymer resins, dicyclopentadiene (DCPD) homopolymer or copolymer resins, terpene homopolymer or copolymer resins, C5-cut homopolymer or copolymer resins and mixtures thereof.

22. The process according to claim 1, wherein the crosslinking system is a vulcanization system based on sulphur and optionally a guanidine derivative.

23. The process according to claim 22, wherein the guanidine derivative is diphenylguanidine (DPG).

24. The process according to claim 22, wherein the vulcanization system comprises between 0.1 and 1.5 phr of sulphur and between 0 and 1.5 phr of guanidine derivative.

25. The process according to claim 1, wherein the masterbatch comprises a natural rubber, synthetic polyisoprenes and mixtures thereof as a sole elastomer.

* * * * *